US009086538B2

(12) United States Patent
Endo et al.

(10) Patent No.: US 9,086,538 B2
(45) Date of Patent: Jul. 21, 2015

(54) METHOD FOR FUSION SPLICING OPTICAL FIBERS

(75) Inventors: Soichi Endo, Yokohama (JP); Osamu Ikejima, Yokohama (JP); Kazunari Hattori, Yokohama (JP)

(73) Assignee: SEI Optifrontier Co., Ltd., Yokohama (JP)

( * ) Notice: Subject to any disclaimer, the term of this patent is extended or adjusted under 35 U.S.C. 154(b) by 135 days.

(21) Appl. No.: 13/878,635

(22) PCT Filed: Oct. 7, 2011

(86) PCT No.: PCT/JP2011/073198
§ 371 (c)(1),
(2), (4) Date: Apr. 10, 2013

(87) PCT Pub. No.: WO2012/050055
PCT Pub. Date: Apr. 19, 2012

(65) Prior Publication Data
US 2013/0195409 A1 Aug. 1, 2013

(30) Foreign Application Priority Data
Oct. 14, 2010 (JP) .................................. 2010-231177

(51) Int. Cl.
*G02B 6/255* (2006.01)
*G02B 6/02* (2006.01)

(52) U.S. Cl.
CPC ............ *G02B 6/255* (2013.01); *G02B 6/02333* (2013.01); *G02B 6/2551* (2013.01); *G02B 6/2552* (2013.01)

(58) Field of Classification Search
None
See application file for complete search history.

(56) References Cited

U.S. PATENT DOCUMENTS

| 5,018,824 A * | 5/1991 | Ooe et al. ......................... 385/99 |
| 6,652,163 B2 * | 11/2003 | Fajardo et al. ................... 385/96 |
| 2003/0081915 A1 | 5/2003 | Fajardo et al. |
| 2003/0231845 A1 | 12/2003 | Patlakh et al. |

(Continued)

FOREIGN PATENT DOCUMENTS

| JP | 2003-167145 A | 6/2003 |
| JP | 2005-508020 A | 3/2005 |

(Continued)

OTHER PUBLICATIONS

Xiao et al., "Fabrication of selective injection microstructred optical fibers with a conventional fusion splicer", Optics Express, vol. 13, No. 22, Oct. 2005, pp. 9014-9022.*

(Continued)

*Primary Examiner* — Lisa Herring
(74) *Attorney, Agent, or Firm* — Global IP Counselors, LLP

(57) ABSTRACT

A method for fusion splicing of a holey optical fiber with a cladding having a large number of air holes along the axis thereof to another optical fiber includes the use of arc discharge heating. First, the method uses arc discharge heating such that the temperature of a position rearward of an end surface of the holey optical fiber is higher than the temperature of the end surface, thereby making a tip portion of the holey optical fiber transparent. Next, the cores are aligned with one another. Then the method includes performing fusion splicing by second arc discharge heating. The first arc discharge heating is performed between discharge electrodes positioned rearward of the end surface of the holey optical fiber. The arc heating time of the first arc discharge heating is preferably 200 to 400 milliseconds.

9 Claims, 7 Drawing Sheets

(56) References Cited

U.S. PATENT DOCUMENTS

2008/0110209 A1    5/2008  Bookbinder et al.
2009/0052854 A1*   2/2009  Miyabe et al. ................ 385/127

FOREIGN PATENT DOCUMENTS

| JP | 2008-164935 A |   | 7/2008 |
| JP | 2008164935 A  | * | 7/2008 |
| JP | 2010-509641 A |   | 3/2010 |
| WO | 03-038496 A1  |   | 5/2003 |
| WO | 2008-063401 A1|   | 5/2008 |

OTHER PUBLICATIONS

Extended European Search Report of the corresponding European Patent Application No. 11832490.4, dated Feb. 13, 2014.

English translation of PCT/ISA/237 issued in the counterpart PCT Application No. PCT/JP2011/073198.

* cited by examiner

METHOD FOR FUSION SPLICING OPTICAL FIBERS

CROSS-REFERENCE TO RELATED APPLICATIONS

This U.S. National stage application claims priority under 35 U.S.C. §119(a) to Japanese Patent Application No. 2010-231177, filed in Japan on Oct. 14, 2010, the entire contents of which are hereby incorporated herein by reference.

TECHNICAL FIELD

The present invention relates to a method for fusion splicing optical fibers including a cladding having a large number of air holes by arc discharge heating.

BACKGROUND ART

Holey optical fibers are optical fibers including a cladding surrounding a core and having a large number of fine air holes arranged regularly or randomly along the axis thereof to reduce the refractive index of the cladding so that it has a refractive index different from the core. Holey optical fibers allow the refractive index of the cladding to be drastically changed without adding a dopant and are available in various forms, including those including a cladding having a large number of air holes arranged concentrically in a portion thereof and those including a cladding having a large number of air holes arranged over the entire region thereof. FIG. 5 shows sectional views illustrating examples of holey optical fibers. A holey optical fiber 1 in region (A) of FIG. 5 includes a core 2 and a cladding 3 surrounding the core 2, and the cladding 3 includes, in order from inside concentrically, an inner region 3a having no air holes, an intermediate region 3b having a large number of fine air holes 4, and an outer region 3c having no air holes.

FIG. 6 is a side view illustrating fusion splicing of holey optical fibers 100a and 100b. Fusion splicing is performed by melting end surfaces 105a and 105b of the optical fibers with heat generated by arc discharge between a pair of discharge electrodes 104 arranged perpendicular to the axial direction of the optical fibers 100a and 100b and bringing the end surfaces 105a and 105b into abutment. As shown in FIG. 7, however, when a holey optical fiber 100 is optically observed by simply illuminating the side surface thereof, a core 101 cannot be detected because of the presence of a large number of fine air holes 103. This prevents positioning by core alignment and therefore prevents precise fusion splicing.

Japanese Unexamined Patent Application Publication (Translation of PCT Application) No. 2010-509641 discloses a fusion splicing method that can detect the core optically from the side thereof by filling air holes at the tips of optical fibers. In this method, the end surfaces 105a and 105b of the optical fibers 100a and 100b are heated by arc discharge at a distance from each other prior to bringing them into abutment to fill the air holes 103 at the tips of the optical fibers 100a and 100b so that the core is optically detectable. After that, the optical fibers 100a and 100b are positioned by optically detecting the core and performing core alignment, and the end surfaces 105a and 105b of the optical fibers are brought into abutment and are fusion-spliced by arc discharge heating.

FIG. 8 is a conceptual diagram illustrating the temperature profile at the tips of the optical fibers during arc discharge heating prior to bringing them into abutment. The end surfaces 105a and 105b of the holey optical fibers 100a and 100b are heated by arc discharge at a distance L from each other across an axis Y passing through the center of the pair of discharge electrodes 104. The heating temperature is highest at the position where the axis Y passes and becomes lower toward the rears of the optical fibers. Thus, the portions exposed to the highest temperature in the optical fibers are the end surfaces 105a and 105b, whose corners are rounded into a shape having a relatively large radius of curvature R. As the radius of curvature R of the corners of the end surfaces 105a and 105b becomes larger, the area fused by fusion splicing becomes smaller due to misalignment and narrowing of the spliced portion, which tends to increase splicing defects and splicing loss. Conversely, if the amount of heat generated by arc discharge is reduced for a smaller radius of curvature R, the air holes in the optical fibers are insufficiently filled, which prevents the position of the core from being detected and thus makes core alignment difficult.

SUMMARY OF INVENTION

Technical Problem

An object of the present invention is to provide a method for fusion splicing of optical fibers by which air holes in a holey optical fiber can be effectively filled to allow core alignment with reduced deformation of the corner of an end surface of the optical fiber.

Solution to Problem

To achieve the object, there is provided a method for fusion splicing of a holey optical fiber including a cladding, having a large number of air holes to another optical fiber. This method includes (1) performing first arc discharge heating in a tip portion of the holey optical fiber such that the temperature of a position rearward of an end surface of the holey optical fiber is higher than the temperature of the end surface, thereby making the tip portion transparent; (2) positioning an end surface of the holey optical fiber and an end surface of the other optical fiber opposite each other and aligning the holey optical fiber and the other optical fiber while observing a core of the holey optical fiber and a core of the other optical fiber from the side thereof such that the central axes of the cores coincide; and (3) melting the end surface of the holey optical fiber and the end surface of the other optical fiber by second arc discharge heating and bringing the end surface of the holey optical fiber and the end surface of the other optical fiber into abutment. As used herein, the term "make transparent" means filling air holes in an optical fiber to such an extent that a core is optically detectable from the side thereof, rather than completely filling the air holes.

Preferably, the first arc discharge heating is performed between discharge electrodes positioned rearward of the end surface of the holey optical fiber. Preferably, the arc heating time of the first arc discharge heating is 200 to 400 milliseconds.

Advantageous Effects of Invention

According to the present invention, a tip portion of a holey optical fiber can be made transparent with reduced deformation of the corner of an end surface of the optical fiber to perform core alignment while observing the core, thus providing a high-quality, low-loss fusion splice.

DESCRIPTION OF EMBODIMENTS

Figure 1:
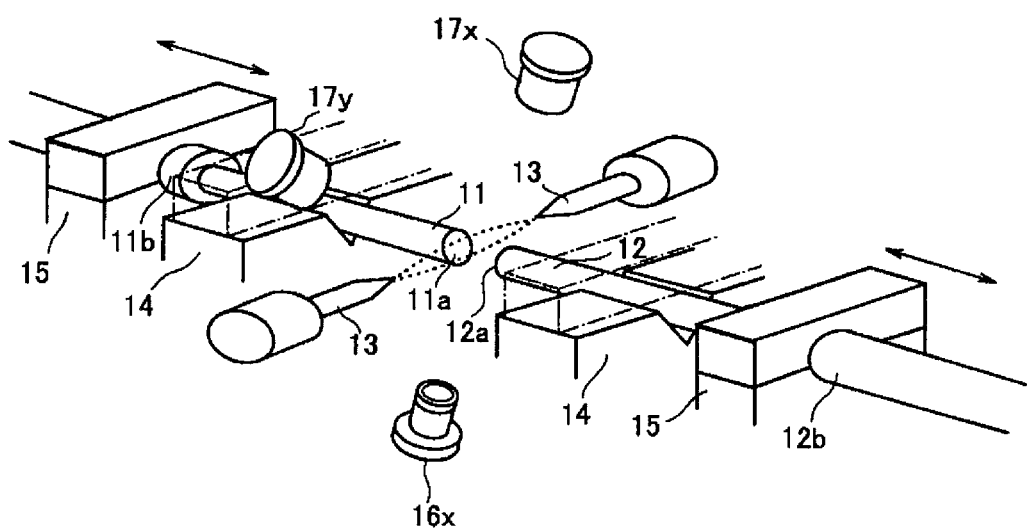
FIG. 1 is a conceptual diagram illustrating an example of a fusion splicer used in the present invention.

An embodiment of the present invention will now be described with reference to the drawings. The drawings are for illustration purposes only and should not be construed as limiting the scope of the invention. In the drawings, identical references denote like portions to avoid redundant description. The drawings are not necessarily drawn to scale.

Figure 5:
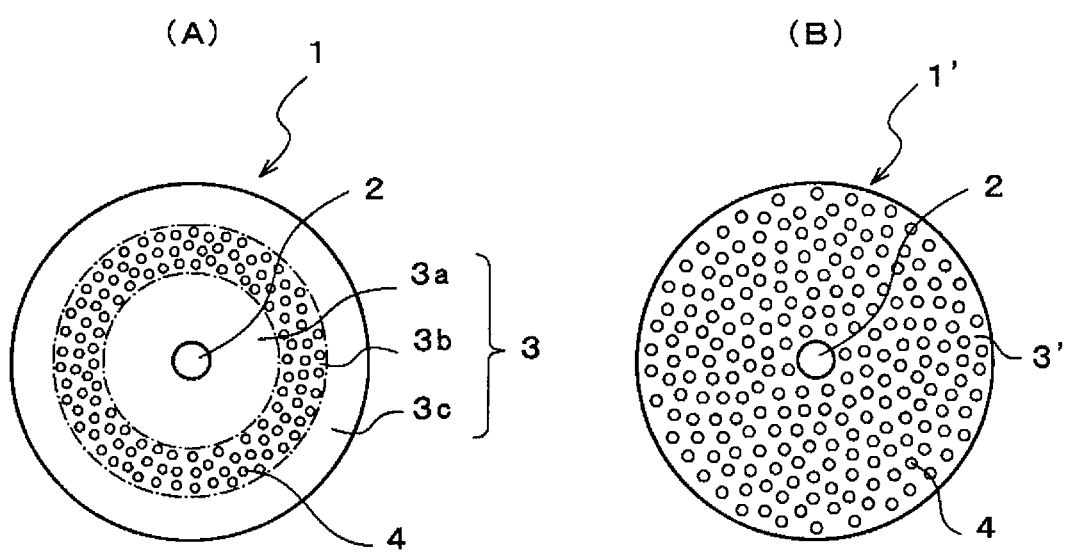
FIG. 5 shows sectional views illustrating examples of holey optical fibers.
Figure 6:
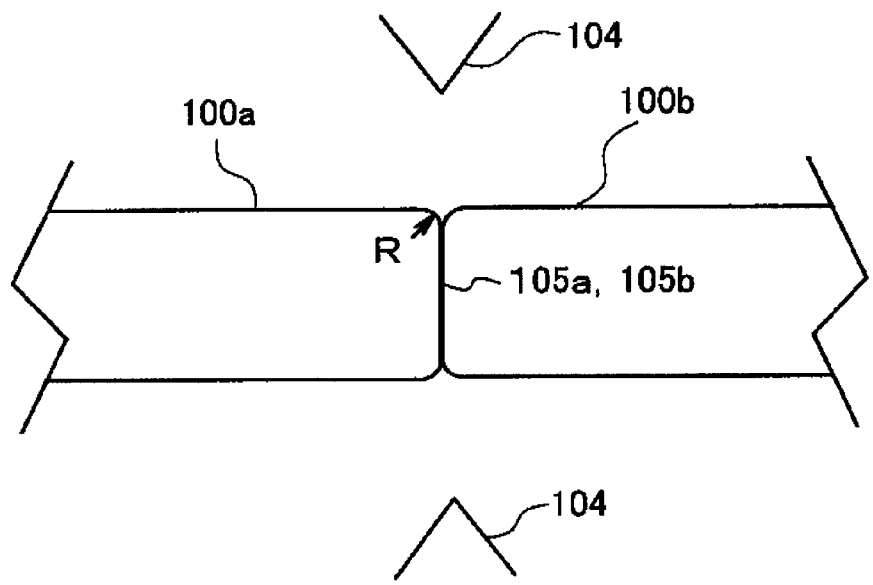
FIG. 6 is a side view illustrating fusion splicing of holey optical fibers in the related art.
Figure 7:
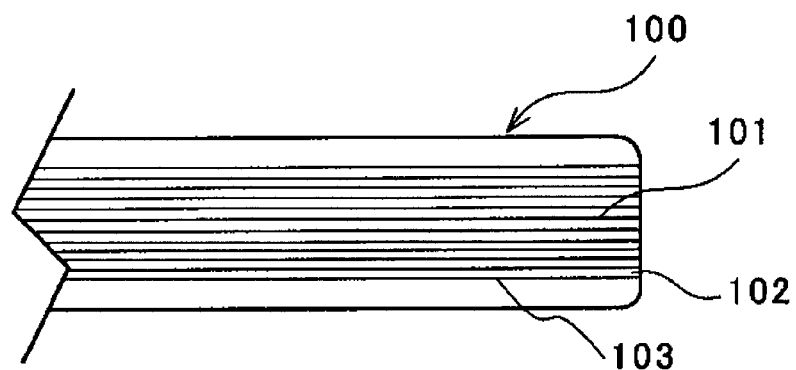
FIG. 7 is a side view of the tip of a holey optical fiber in the related art.

FIG. 5 shows sectional views illustrating examples of holey optical fibers. The example illustrated in region (A) of FIG. 5 is a holey optical fiber 1 including an optical fiber cladding 3 having fine air holes 4 arranged concentrically in a portion thereof. The holey optical fiber 1 has a core 2 in the center thereof, and the cladding 3, which surrounds the core, includes an inner region 3a having no air holes, an intermediate region 3b having a large number of fine air holes 4 outside the inner region 3a, and an outer region 3c having no air holes outside the intermediate region 3b, which are arranged concentrically. The example illustrated in region (B) of FIG. 5 is a holey optical fiber 1' having a core 2 in the center thereof and a cladding 3' surrounding the core and having a large number of fine air holes 4 arranged over the entire region thereof.

The holey optical fibers 1 and 1' are, for example, single-mode fibers. The glass portion has a standard outer diameter, i.e., 125 µm, and the core 2 has a diameter of, for example, about 7 to about 10 µm. As with common optical fibers, the outer surface of the glass portion is protected by a fiber coating (not shown) for increased mechanical strength.

FIG. 1 is a conceptual diagram illustrating an example of a fusion splicer used in the present invention, which is used for fusion splicing of holey optical fibers, described above. Both of the optical fibers 11 and 12 to be fusion-spliced to each other may be holey optical fibers, or one of them may be a normal optical fiber having no air holes. The description below illustrates an example where both of the optical fibers 11 and 12 to be fusion-spliced to each other are holey optical fibers.

Prior to fusion splicing, fiber coatings 11b and 12b are removed from the tips of the pair of holey optical fibers 11 and 12, respectively, by a predetermined length to expose the glass portions thereof. The end portions of the fiber coatings 11b and 12b of both optical fibers are secured by clamps 15 for the coated portions, and the glass portions are held and secured by V-grooves 14 and clamps (not shown) for the glass portions. The end surfaces 11a and 12a of the tips of both optical fibers are cut perpendicular to the axis or are cut at a predetermined angle to prevent reflection of signal light, and are positioned opposite each other. In addition, the positions of the tips of the optical fibers and the conditions of the end surfaces 11a and 12a are observed in two directions using an image observation mechanism including lamps 17x and 17y and picture cameras 16x and 16y (not shown) that are disposed perpendicular to each other.

A pair of discharge electrodes 13 are disposed opposite each other with the end surfaces 11a and 12a of the optical fibers therebetween perpendicular to the axis of the holey optical fibers 11 and 12 to be fusion-spliced to each other. The optical fibers are fusion-spliced by melting the end surfaces 11a and 12a of the left and right optical fibers with heat generated by arc discharge between the discharge electrodes 13 and bringing the end surfaces 11a and 12a into abutment, where the tips to be spliced are usually subjected to cleaning arc heating (also called sputtering arc heating) to such an extent that the optical fibers are not melted before they are fusion-spliced. This cleaning arc heating removes contaminants such as moisture, dust, and debris left after fiber cleaving from the end surfaces 11a and 12a of the tips of the optical fibers and the vicinities thereof.

For fusion splicing of normal optical fibers having no air holes, cleaning arc heating is performed by positioning the end surfaces 11a and 12a of the optical fibers opposite each other with a predetermined gap therebetween and applying an electric arc between the discharge electrodes 13 such that the center of the electric arc passes through the center of the gap between the end surfaces 11a and 12a of the optical fibers. Thus, the tips of both optical fibers 11 and 12 are simultaneously heated and cleaned.

In the present invention, as described later, during cleaning arc heating (first arc discharge heating), the tips of the optical fibers 11 and 12 to be fusion-spliced to each other are made transparent by filling the air holes by heating to allow image observation of the cores of the optical fibers. Also, in the present invention, as described later, the tips of the left and right optical fibers 11 and 12 are separately cleaned by discharge heating such that the center of the electric arc passes through a position rearward of the end surfaces 11a and 12a of the optical fibers.

Figure 2:
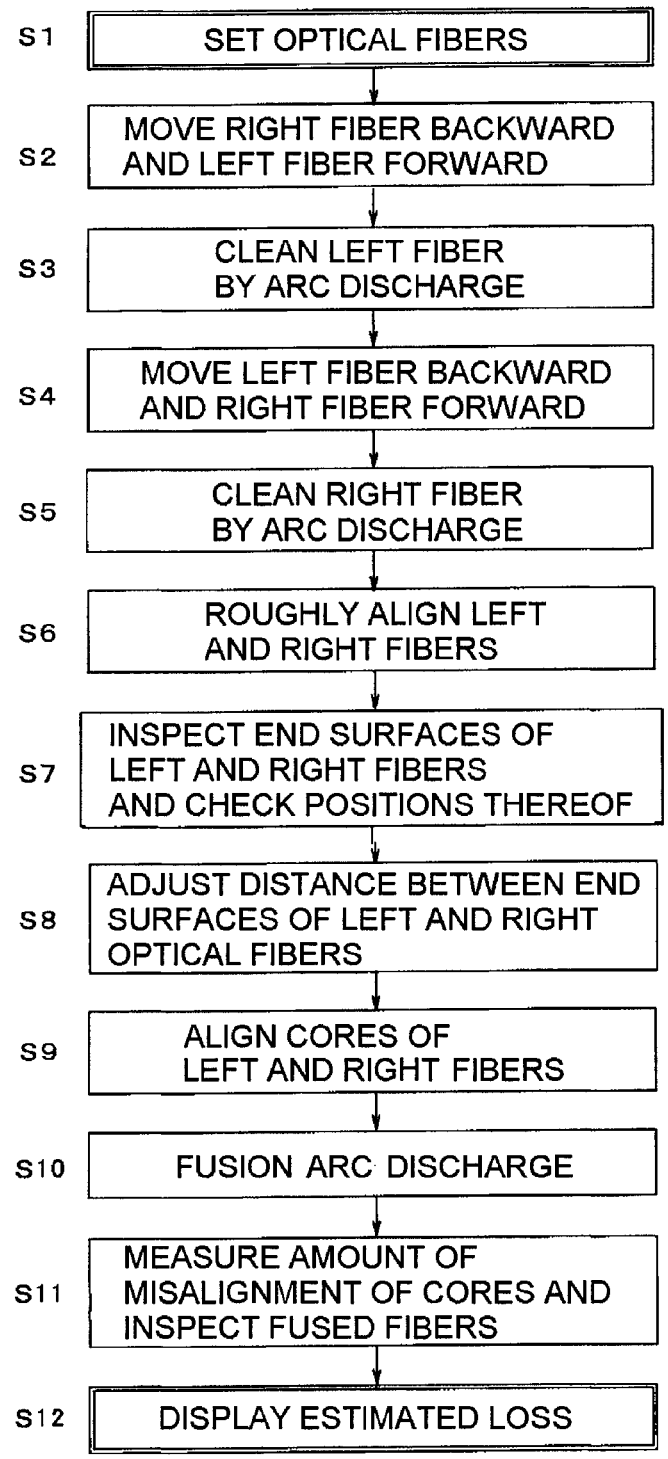
FIG. 2 is a flowchart illustrating a method for fusion splicing of holey optical fibers according to the present invention.
Figure 3:
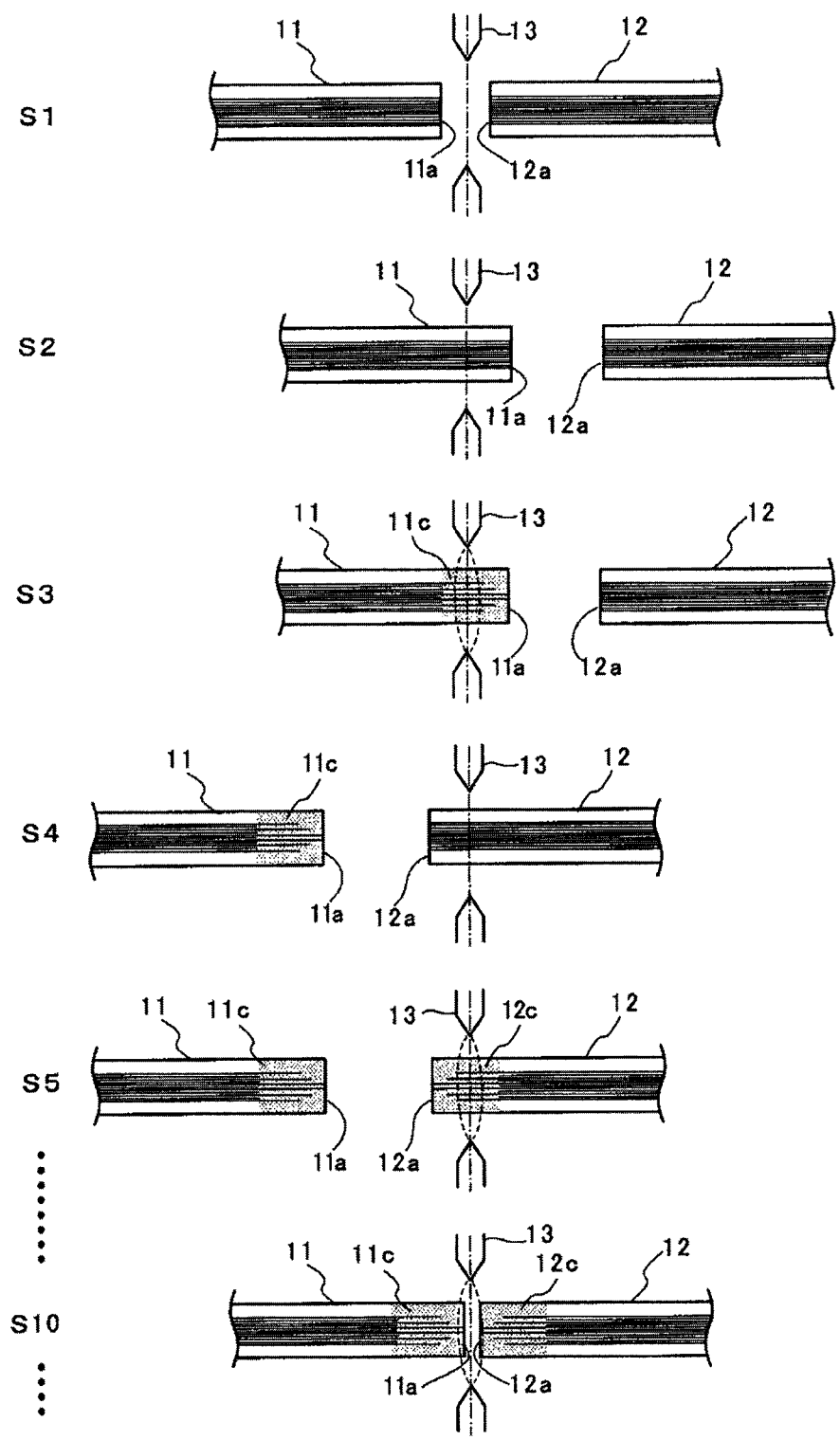
FIG. 3 shows the processing states in steps S1 to S5 and S10 in FIG. 2.

Next, a method for fusion splicing of holey optical fibers according to the present invention will be described. FIG. 2 is a flowchart illustrating the method for fusion splicing of holey optical fibers according to the present invention. FIG. 3 shows the processing states in steps S1 to S5 and S10 in FIG. 2.

The pair of optical fibers 11 and 12 are first set on the fusion splicer illustrated in FIG. 1 while observing the conditions and positions of the end surfaces 11a and 12a of the optical fibers using the lamps 17x and 17y and the picture cameras 16x and 16y (step S1). The right optical fiber 12 is then moved backward, and the left optical fiber 11 is moved forward to a position where the end surface 11a is located to the right of the center of the discharge electrodes 13 by a predetermined length (step S2). In this state, the tip of the left optical fiber 11 is cleaned by arc heating (first arc discharge heating) between the discharge electrodes 13 (step S3). This heating fills the air holes at the tip of the left optical fiber 11, thus making a tip portion 11c thereof transparent.

The left optical fiber 11 treated by cleaning arc heating is then moved backward, and the right optical fiber 12 is moved forward to a position where the end surface 12a is located to the left of the center of the discharge electrodes 13 by a predetermined length (step S4). In this state, the right optical fiber 12 is cleaned by arc heating between the discharge electrodes 13 (step S5). This heating fills the air holes at the tip of the right optical fiber 12, thus making a tip portion 12c thereof transparent.

In steps S2 and S4, the length by which the end surfaces 11a and 12a of the optical fibers are positioned forward of the center of the discharge electrodes 13 is adjusted depending on, for example, the type of optical fiber and the number of air holes. The optical fibers to be moved backward are moved backward to a position where there is no influence of cleaning arc heating. Again, the arc heating time of the cleaning arc heating in steps S3 and S5 depends on the type of optical fiber and the number and size of air holes, although, as described later, the temperature is set to a level that does not considerably deform the corners of the end surfaces 11a and 12a of the optical fibers.

After the cleaning arc heating in steps S1 to S5 prior to fusion splicing is completed, the optical fibers 11 and 12 are returned to the initial set positions and are roughly aligned (step S6). In the rough alignment, the fusion splicing position is roughly determined based on the outer diameter of the fibers 11 and 12 using the fusion splicer in FIG. 1 by moving the clamps 15 for the coated portions and the V-grooves 14. The conditions and positions of the end surfaces 11a and 12a of the optical fibers are checked (step S7), and if there is no problem, the distance between the end surfaces 11a and 12a of the optical fibers is adjusted to a predetermined distance suitable for fusion splicing of optical fibers (step S8).

The cores of the left and right optical fibers are then aligned (step S9). In the core alignment, images of the optically transparent tips of the optical fibers 11 and 12 are captured using the lamps 17x and 17y and the picture cameras 16x and 16y, and the positions and inclinations of the cores are detected by image processing of the luminance distributions in cross-sections of the fibers 11 and 12 at a plurality of positions along the axis thereof. The cores of the optical fibers 11 and 12 are then aligned by finely adjusting the positions of, for example, the clamps 15 for the coated portions and the V-grooves 14 so that the cores are arranged in a straight line.

After that, the end surfaces 11a and 12a of the optical fibers are melted by fusion discharge heating (second arc discharge heating) with a predetermined discharge power for a predetermined discharge time and are brought into abutment by pressing one end surface against the other end surface to form a fusion splice (step S10). Images of the transparent tips of the optical fibers and the fused condition thereof are then captured using the lamps 17x and 17y and the picture cameras 16x and 16y, and the measurement of the amount of misalignment of the cores and overall observation are performed (step S11). The estimated loss is then calculated based on, for example, the amount of misalignment of the cores, and is displayed (step S12).

Figure 4:
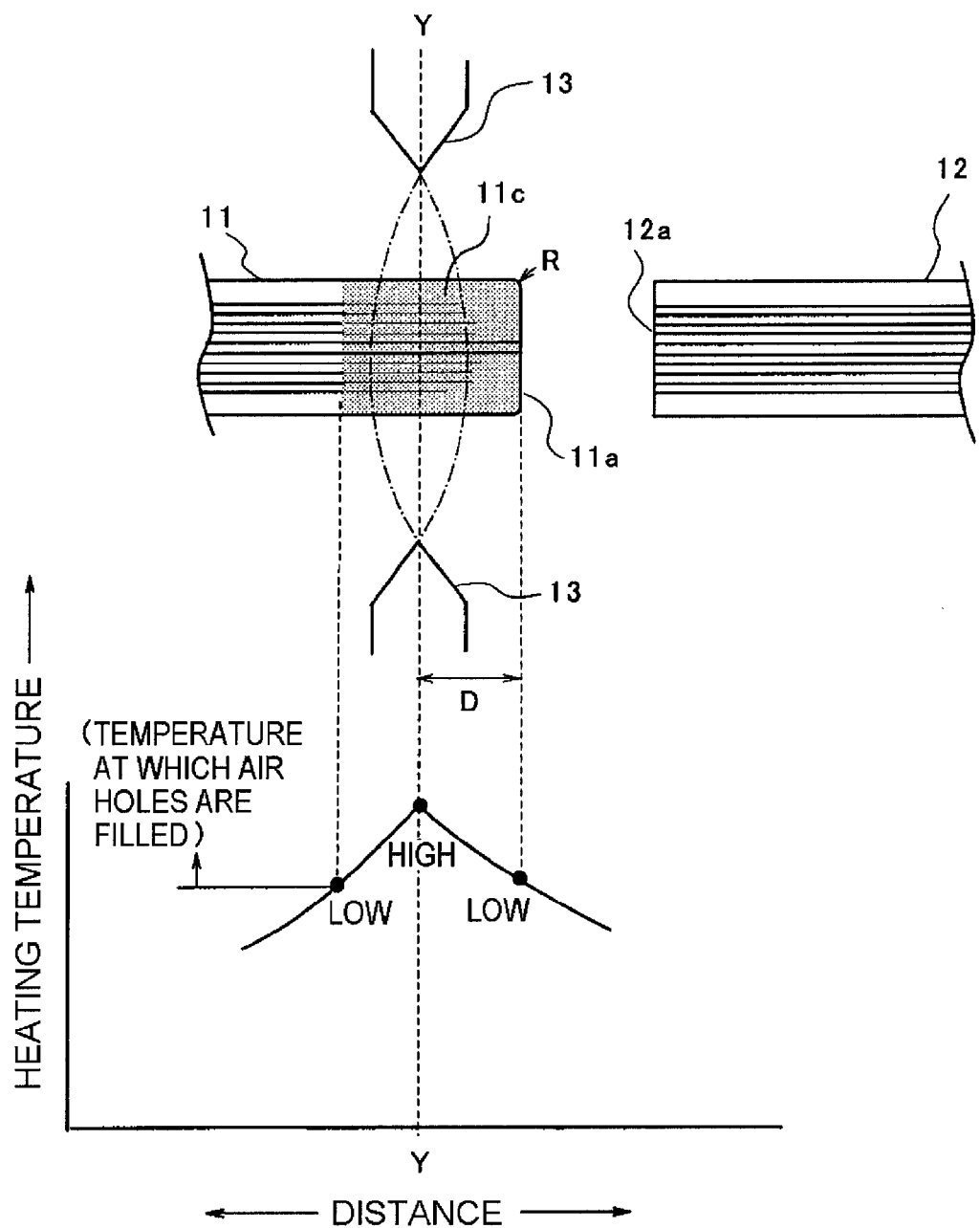
FIG. 4 is a conceptual diagram illustrating the temperature profile at the tip of an optical fiber in step S3 in FIG. 2.

FIG. 4 is a conceptual diagram illustrating the temperature profile at the tip of the optical fiber in step S3 in FIG. 2. Prior to cleaning arc heating, the end surface 11a of the optical fiber 11 is positioned forward of a line Y passing through the center of the discharge electrodes 13 by a distance D. That is, during the cleaning arc heating, an electric arc is applied at a position rearward of the end surface 11a of the optical fiber 11. This position rearward of the end surface 11a is hereinafter referred to as a heating position. As a result, the temperature of the end surface 11a of the optical fiber 11 is lower than the temperature at the rear position where the center of the electric arc passes. The temperature of the end surface 11a of the optical fiber is set to a temperature at which the air holes in the holey optical fiber can be filled. Thus, deformation of the corner of the end surface 11a can be minimized to maintain a small radius of curvature R.

The portion of the tip of the optical fiber that can be optically observed, i.e., the transparent tip portion 11c, preferably extends about 100 to about 200 μm from the end surface of the optical fiber. To form the above observation portion, therefore, it is desirable to set the distance D by which the end surface 11a of the optical fiber is positioned forward of the center of the discharge electrodes 13 during the cleaning arc heating to half of that length, i.e., about 50 to about 100 μm. In other words, the heating position and the end surface 11a are spaced apart by the distance D. As mentioned above, the outer diameter of the glass portion (the cladding 3) of the holey optical fibers 1 and 1' is 125 μm. Therefore, the ratio between the heating position (distance D from the end surface 11a) and the diameter of the cladding 3 (glass portion) is between 50:125 and 100:125, or, to simplify, a ratio range of between 2:5 and 4:5.

Figure 8:
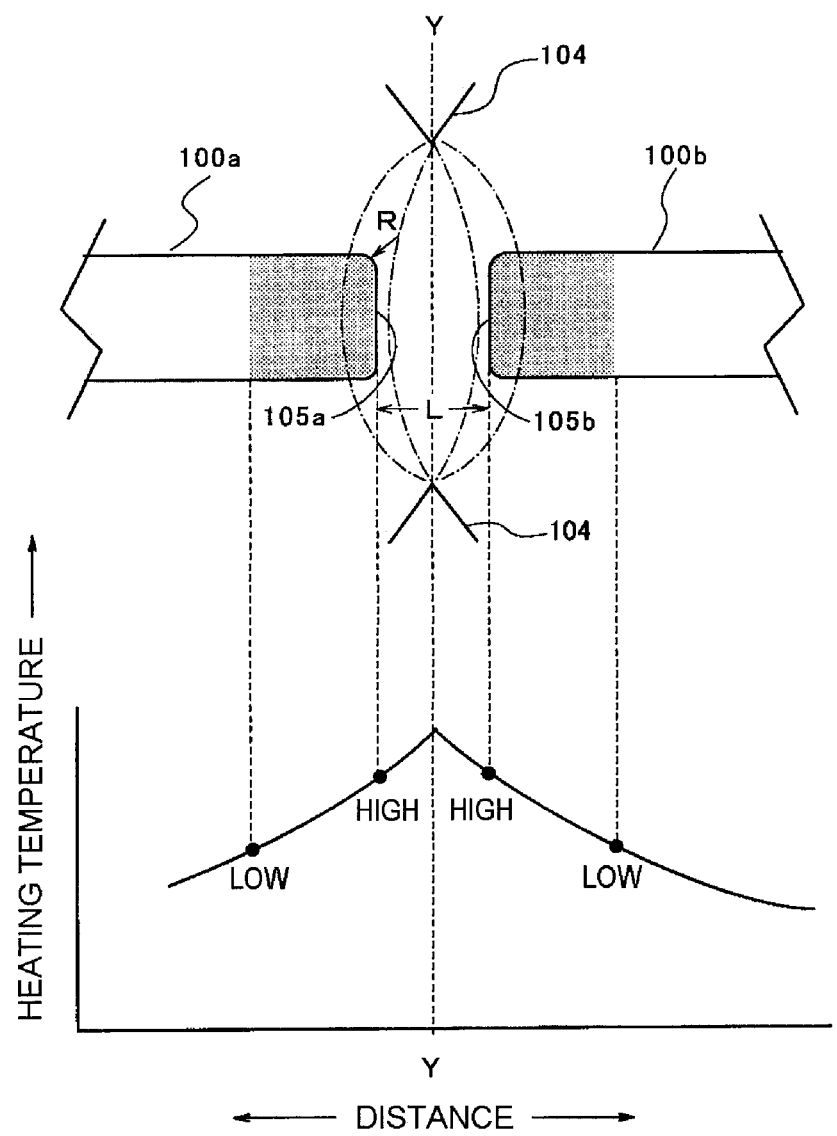
FIG. 8 is a conceptual diagram illustrating the temperature profile at the tips of optical fibers during arc discharge heating prior to bringing them into abutment.

In addition, it is desirable to set the arc heating time of the cleaning arc heating so that the radius of curvature R of the corners of the end surfaces 11a and 12a of the optical fibers after deformation can be reduced to 15 μm or less. Accordingly, it is preferable to set the arc heating time to 400 milliseconds or less. However, it is preferable to set the arc heating time of the cleaning arc heating to 200 milliseconds or more because an extremely short arc heating time results in fewer air holes filled and therefore insufficient transparency. According to the method in the related art in FIG. 8, the required arc heating time is 500 to 1,250 milliseconds, and the radius of curvature R is about 20 μm to about 25 μm.

CITATION LIST

Patent Literature

PTL 1: Japanese Unexamined Patent Application Publication (Translation of PCT Application) No. 2010-509641

The invention claimed is:

1. A method for fusion splicing of a holey optical fiber including a cladding having a large number of air holes to another optical fiber, the cladding having an outer diameter of 125 μm, the method comprising:
performing first arc discharge heating at a heating position in a tip portion of the holey optical fiber to be fusion-spliced such that a temperature of the heating position of the holey optical fiber is higher than a temperature of an end surface of the holey optical fiber, where the heating position is spaced apart from the end surface of the holey optical fiber during the first arc discharge heating by a distance, such that a ratio between the distance and the diameter of the cladding of the holey optical fiber is between 2:5 and 4:5, and the first arc discharge heating is such that the tip portion including the end surface is made transparent;
positioning the end surface of the holey optical fiber and an end surface of the another optical fiber opposite each other and aligning the holey optical fiber and the another optical fiber while observing a core of the holey optical fiber and a core of the another optical fiber from the side thereof such that central axes of the cores coincide; and
melting the end surface of the holey optical fiber and the end surface of the another optical fiber by second arc discharge heating and bringing the end surface of the holey optical fiber and the end surface of the another optical fiber into abutment fixing the end surface of the holey optical fiber directly to the end surface of the another optical fiber.

2. The method for fusion splicing of the optical fibers according to claim 1, wherein the first arc discharge heating is performed between discharge electrodes that are positioned to heat the heating position and areas adjacent to the heating position of the end surface of the holey optical fiber.

3. The method for fusion splicing of the optical fibers according to claim 2, wherein the arc heating time of the first arc discharge heating is 200 to 400 milliseconds.

4. The method for fusion splicing of the optical fibers according to claim 1, wherein the performing of the first arc discharge heating includes forming a radius of curvature of at the corner of the end surface of the holey optical fiber that is 15 µm or less.

5. The method for fusion splicing of the optical fibers according to claim 1, wherein the method includes:
cutting the holey optical fiber that is to be fusion-spliced exposing the end surface of a tip portion of the holey optical fiber and thereafter performing of the first arc discharge heating.

6. A method for fusion splicing of a holey optical fiber including a cladding having a large number of air holes to another optical fiber, the method comprising:
cutting the holey optical fiber that is to be fusion-spliced exposing an end surface of a tip portion of the holey optical fiber;
performing first arc discharge heating at a heating position in the tip portion of the holey optical fiber being fusion-spliced, the heating position being spaced apart from the end surface by a predetermined distance such that a temperature of the heating position of the holey optical fiber is higher than a temperature of the end surface of the holey optical fiber, the first arc discharge heating is such that the tip portion including the end surface, is made transparent;
positioning the end surface of the holey optical fiber and an end surface of the another optical fiber opposite each other and aligning the holey optical fiber and the another optical fiber while observing a core of the holey optical fiber and a core of the another optical fiber from the side thereof such that central axes of the cores coincide; and
melting the end surface of the holey optical fiber and the end surface of the another optical fiber by second arc discharge heating and bringing the end surface of the holey optical fiber and the end surface of the another optical fiber into abutment fixing the end surface of the holey optical fiber directly to the end surface of the another optical fiber.

7. The method for fusion splicing of the optical fibers according to claim 6, wherein the first arc discharge heating is performed between discharge electrodes that are positioned to heat the heating position and areas adjacent to the heating position of the end surface of the holey optical fiber.

8. The method for fusion splicing of the optical fibers according to claim 7, wherein the arc heating time of the first arc discharge heating is 200 to 400 milliseconds.

9. The method for fusion splicing of the optical fibers according to claim 6, wherein
the cladding of the holey optical fiber has an outer diameter of 125 µm, and
the performing of the first arc discharge heating includes forming a radius of curvature of at the corner of the end surface of the holey optical fiber that is 15 µm or less.

* * * * *